R. C. BLACK & L. A. MAIDEN.
GARDEN TOOL.
APPLICATION FILED OCT. 30, 1918.

1,302,290.

Patented Apr. 29, 1919.
2 SHEETS—SHEET 1.

Witnesses
R. A. Thomas

Inventors
R. C. Black
L. A. Maiden
By Victor J. Evans
Attorney

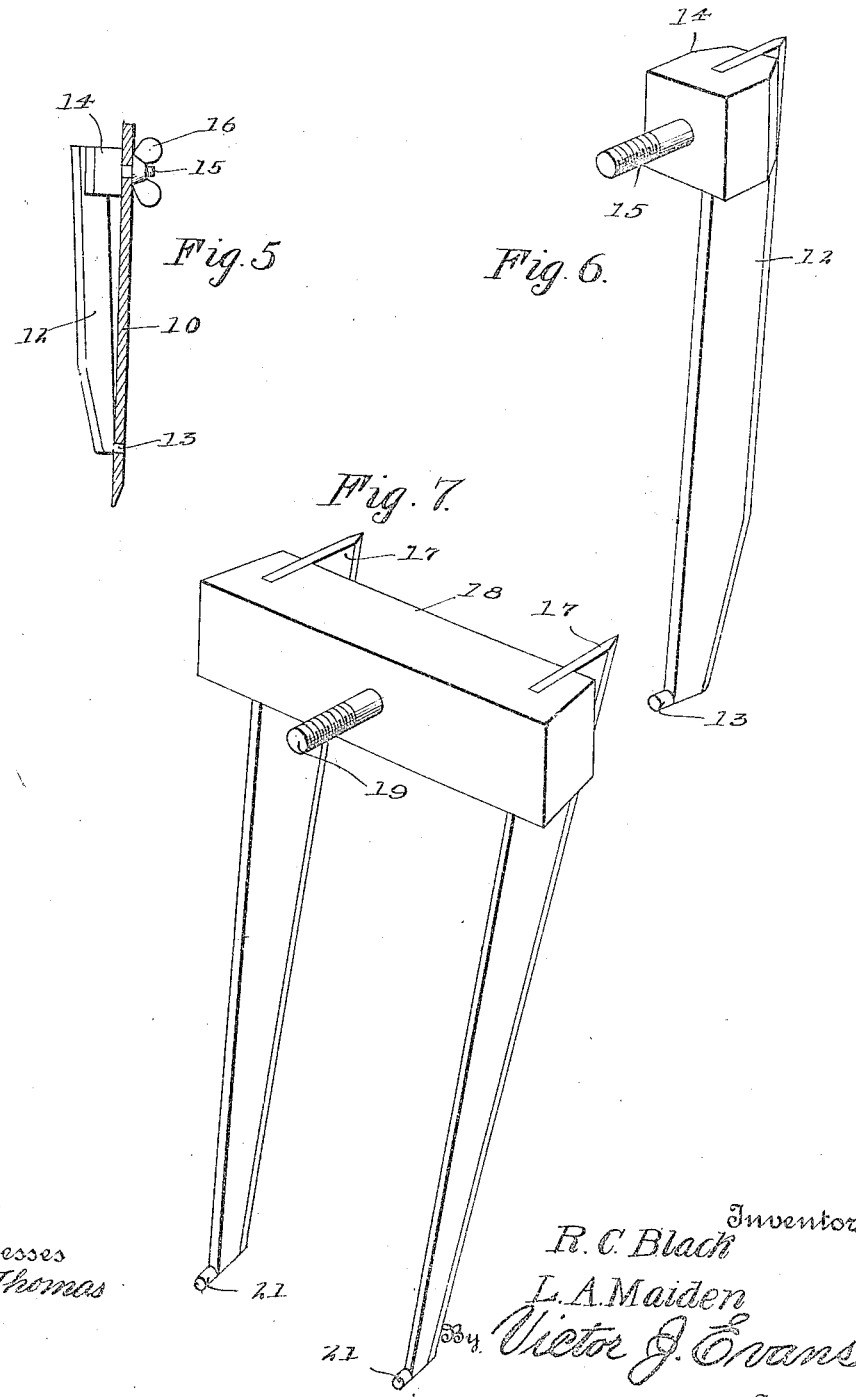

# UNITED STATES PATENT OFFICE.

ROBERT C. BLACK AND LEAMAN A. MAIDEN, OF DUNNELLON, FLORIDA.

GARDEN-TOOL.

1,302,290.

Specification of Letters Patent.

Patented Apr. 29, 1919.

Application filed October 30, 1918. Serial No. 260,330.

*To all whom it may concern:*

Be it known that we, ROBERT C. BLACK and LEAMAN A. MAIDEN, citizens of the United States, residing at Dunnellon, in the county of Marion and State of Florida, have invented new and useful Improvements in Garden-Tools, of which the following is a specification.

This invention has reference to garden tools, and particularly to hoes, and has for its object to provide a device of this kind with blades to facilitate the cutting action thereof as well as to crumble and mix the soil engaged thereby.

Other objects and advantages will appear as the nature of the invention is better understood, reference being had to the accompanying drawings, in which:

Fig. 5 is a section approximately on the line 5—5 of Fig. 2;

Fig. 6 is a perspective view of one of the detachable blades; and

Fig. 7 is a similar view of a pair of connected blades.

Figure 1:
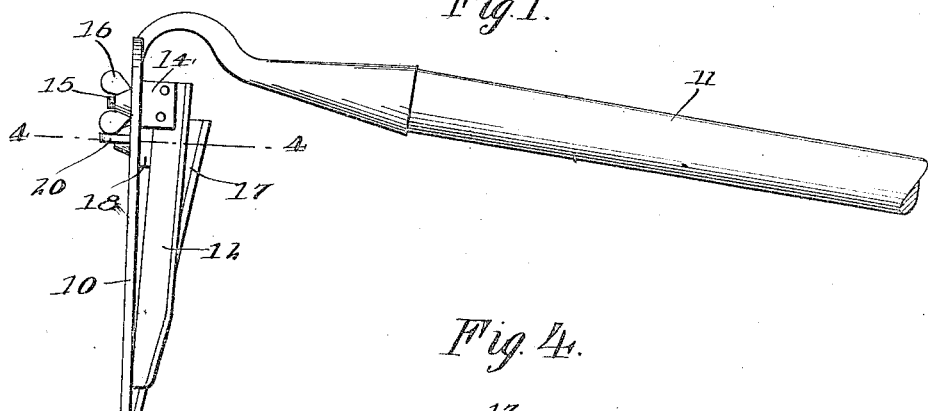
Figure 1 is a side elevation of an implement provided with our improvement.
Figure 4:
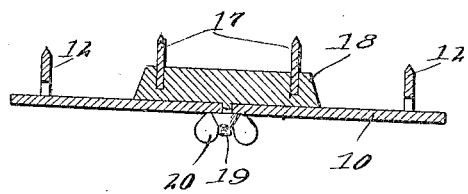
Fig. 4 is a sectional view approximately on the line 4—4 of Fig. 1.
Figure 2:
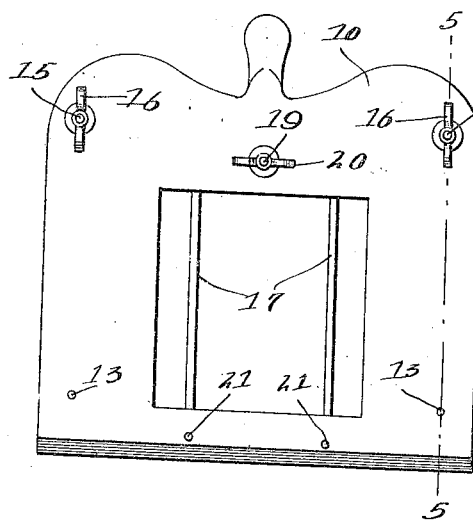
Fig. 2 is a front elevation of the same.
Figure 3:
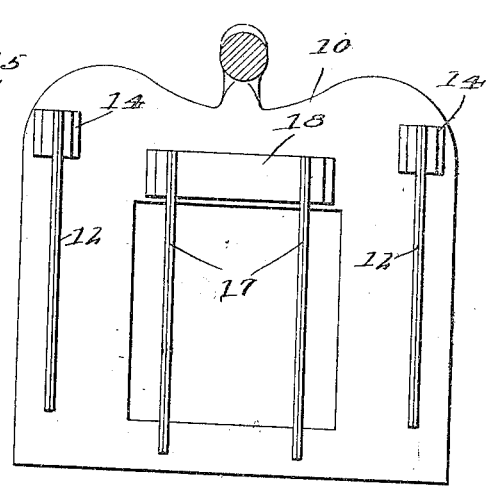
Fig. 3 is a rear elevation thereof.

In the drawings the numeral 10 designates a hoe blade of the usual construction, having at its upper end a socket to receive the usual handle 11.

The hoe, as illustrated by the drawings is centrally provided with a rectangular opening, and is further provided, at suitable spaced intervals with orifices arranged in spaced pairs.

On the inner face of the hoe blade I arrange vertically disposed cutting blades constructed in accordance with the invention.

The end or outer cutting blades are indicated by the numerals 12, each having its lower end upon its inner edge provided with a lug 13 that is designed to be received in the lower and outer orifices. The blades, upon their upper ends, and upon their inner edges are formed with lugs 14 having threaded stems 15 which pass through the upper and outer orifices in the hoe blade. These threaded stems are engaged by thumb nuts 16 whereby the blades are removably attached to the hoe. The outer edges of the blades are sharpened, and by the removal thereof the said edges, when the blades become dull, may be resharpened.

The inner series of blades are indicated by the numeral 17 and are connected, at their upper and inner edges by a rectangular lug 18 that is centrally provided with a threaded shank 19 that passes through the upper central orifice in the hoe blade, and this threaded member is engaged by a wing nut 20. The lower edges of the inner blades have, upon their inner edges lugs 21 that are designed to be received in the lower orifices in the hoe blade.

Preferably the lug of the inner blade is of a greater thickness than the lugs for the outer blades, so that the inner blades are arranged at a different angle than those of the outer blades, but, if desired, and as disclosed by the drawings, the cutting edges of the inner blades are arranged at a greater inclination than those of the outer blades.

While the improvement is described and illustrated in connection with a hoe blade, it is to be understood that the same is not necessarily restricted to this particular use, as such blades may be readily applied to spades and similar garden implements.

It is believed, from the foregoing description the simplicity and advantages of the construction will be apparent without further detailed description.

It should, however, be emphasized that in addition to ordinary hand operated garden implements the improvement may be employed with equal efficiency upon power operated implements, such as plows, steam shovels, etc.

Having thus described the invention, what is claimed as new, is:

1. A hoe or like implement having a vertically disposed series of spaced blades on one of the faces thereof, the cutting edges of said blades being arranged at an inclination and the width of certain of the blades, at the upper portion thereof being greater than that of the remaining blades.

2. A hoe or similar implement having orifices therethrough arranged in spaced pairs, removable blades having lugs on the inner edges thereof received in the lower series of orifices, threaded elements on the upper` edges of the blades received in the upper orifices, and securing elements engaging said threaded elements.

3. The combination with the blade of a hoe or like implement, having an upper and a lower series of orifices, blades arranged vertically on the inner face of said implement, all of said blades having their lower edges formed with angularly arranged lugs received in the lower orifices, a lug upon the upper end of each of the outer blades, a threaded stem thereon projecting through the upper and outer orifices, wing nuts engaging said stems, an elongated lug connecting the upper ends of the intermediate blades, a threaded stem thereon passing through the intermediate upper orifices, and a wing nut coengaging said stem.

In testimony whereof we affix our signatures.

ROBERT C. BLACK, M. D.
LEAMAN A. MAIDEN.